(12) United States Patent
Don et al.

(10) Patent No.: US 8,392,753 B1
(45) Date of Patent: Mar. 5, 2013

(54) AUTOMATIC FAILOVER DURING ONLINE DATA MIGRATION

(75) Inventors: Arieh Don, Newton, MA (US); Ian Wigmore, Westborough, MA (US); Michael Specht, Acton, MA (US); Steven Goldberg, Ashland, MA (US); Vaishali Kochavara, Lowell, MA (US)

(73) Assignee: EMC Corporation, Hopkinton, MA (US)

( * ) Notice: Subject to any disclaimer, the term of this patent is extended or adjusted under 35 U.S.C. 154(b) by 422 days.

(21) Appl. No.: 12/750,391

(22) Filed: Mar. 30, 2010

(51) Int. Cl.
*G06F 11/07* (2006.01)

(52) U.S. Cl. .................... 714/6.3; 714/4.11; 714/4.12

(58) Field of Classification Search .............. 714/4.11, 714/6.3, 4.12
See application file for complete search history.

(56) References Cited

U.S. PATENT DOCUMENTS

| | | | |
|---|---|---|---|
| 7,434,022 B1 | 10/2008 | Scharland et al. | |
| 7,536,503 B1 | 5/2009 | Venkatanarayanan et al. | |
| 7,634,595 B1 | 12/2009 | Brown et al. | |
| 7,640,408 B1 | 12/2009 | Halligan et al. | |
| 7,689,786 B1 | 3/2010 | Riordan et al. | |
| 7,707,331 B1 | 4/2010 | Brown et al. | |
| 7,797,500 B1 | 9/2010 | Lewis et al. | |
| 7,856,022 B1 | 12/2010 | Wigmore | |
| 8,028,062 B1 | 9/2011 | Wigmore et al. | |
| 8,028,110 B1 | 9/2011 | Wigmore | |
| 8,060,710 B1 | 11/2011 | Don et al. | |
| 2004/0243699 A1* | 12/2004 | Koclanes et al. | 709/224 |
| 2004/0260901 A1* | 12/2004 | Yamagami et al. | 711/162 |
| 2005/0229021 A1* | 10/2005 | Lubbers et al. | 714/2 |
| 2005/0229034 A1* | 10/2005 | Fujibayashi | 714/11 |
| 2006/0031594 A1* | 2/2006 | Kodama | 710/5 |
| 2006/0179170 A1* | 8/2006 | Kodama | 710/8 |
| 2007/0050588 A1* | 3/2007 | Tabata et al. | 711/165 |
| 2008/0104347 A1* | 5/2008 | Iwamura et al. | 711/162 |
| 2008/0104443 A1* | 5/2008 | Akutsu et al. | 714/6 |
| 2009/0240898 A1* | 9/2009 | Abe et al. | 711/154 |
| 2010/0122050 A1* | 5/2010 | Hutchison et al. | 711/162 |

* cited by examiner

*Primary Examiner* — Chae Ko
(74) *Attorney, Agent, or Firm* — BainwoodHuang

(57) ABSTRACT

A technique automatically handles a failure during online data migration from a source array to a target array. While a host initially accesses data from the source array using multipath I/O software, the technique involves (i) transitioning the source array to a passive mode, and the target array to an active mode, and (ii) beginning a data transfer operation which transfers data from the source array to the target array. The technique further involves modifying the data on both the target array and the source array in response to modification commands sent to the target array from the host while the data transfer operation is ongoing. The technique further involves automatically failing back to providing access to the data from the source array in response to an event in which the target array loses communication with the source array for a predefined amount of time.

28 Claims, 5 Drawing Sheets

AUTOMATIC FAILOVER DURING ONLINE DATA MIGRATION

Multipath I/O (MPIO) is a feature which provides a host with the ability to utilize multiple physical paths to a data storage array. In particular, if the host is unable to perform an I/O operation on the data storage array through one physical path, the host is able to retry the I/O operation on that array through another physical path. PowerPath® which is offered by EMC Corporation of Hopkinton, Mass. is an example of a multipathing software product.

After a data storage array has been in use for a period of time, the owner of the array may wish to replace that original array with a newer array, i.e., to migrate from the original array to a replacement array perhaps with more capacity, faster processors, newer components, additional features, etc. Open Replicator for Symmetrix (ORS), which is offered by EMC Corporation, is an example of a software product which facilitates creation of point-in-time copies of data to enable effective data migration from an original array to a replacement array while a host maintains online access to host data, i.e., online data migration. Another example is Symmetrix Remote Data Facility (SRDF) which is also offered by EMC Corporation. There are other replication software products available as well.

One conventional approach to online data migration involves making the replacement array available to a host even though some or all of the host data may have not yet been transferred to the replacement array from the original array. That is, the replacement array starts copying the host data from the original array (i.e., a background copy task), but behaves to the host as if all of the host data already resides on the replacement array. Along these lines, if the replacement array receives a host I/O request for particular host data that has not yet been copied from the original array, the replacement array immediately copies that host data in response to the I/O request, i.e., a copy-on-demand operation. Once the replacement array receives the requested host data from the original array, the replacement array provides that host data to the host as well as stores that host data thereafter. This process of "hot pulling" host data from the original array in response to host I/O requests can continue in conjunction with standard background data copying until all of the host data has been copied from the original array to the replacement array.

SUMMARY

Unfortunately, there may be a deficiency in the above-described conventional online data migration approach. In particular, a host may lose access to host data on the target array if a partial failure occurs during online data migration. For example, communications paths between the target array and the source array may fail or become corrupted while communications paths between the host and the source array remain intact. As another example, the target array may become unavailable (e.g., the target array may crash altogether, the network interfaces on the target array may fail, the target array may lose access to power, etc.).

In contrast to the above-described conventional online data migration approach, improved techniques provide an automatic failover mechanism which enables a host to continue to access host data from a source array when access to a target array is lost during host data migration from the source array to the target array. In particular, while the host data migrates from the source array to the target array and while the target array offers copy-on-demand access to the host data, the target array provides donor updates which duplicate target array modifications to the host data but on the source array. Accordingly, the source array maintains a complete up-to-date copy of the host data. Additionally, the source and target arrays exchange heartbeat signals. Accordingly, the source array is able to automatically detect when data migration has stopped (i.e., no receipt of heartbeat signals). Similarly, the target array (if still operational) can automatically detect when data migration has stopped. As a result, if the source array determines that data migration has stopped (i.e., if the source array loses communication with the target array), the source array can provide the host with access to the host data in a failover manner.

Some embodiments are directed to a method of handling a failure during online data migration from a source array to a target array. While a host initially accesses data from the source array using multipath I/O software, the method includes (i) transitioning the source array to a passive mode (i.e., source devices are no longer capable of performing host read and write operations), and the target array to an active mode (i.e., target devices are now capable of performing host read and write operations), and (ii) beginning a data transfer operation which transfers data from the source array to the target array. The method further includes modifying the data on both the target array and the source array in response to modification commands sent to the target array from the host while the data transfer operation is ongoing. The method further includes automatically failing back to providing access to the data from the source array in response to an event in which the target array loses communication with the source array for a predefined amount of time.

In some arrangements, automatically failing back includes transitioning the target array back to the passive mode by moving the target array from the active mode to a stalled-active mode immediately after detection of the failure event and while the source array is in the passive mode. Such arrangements further involve waiting a predefined amount of time and then moving the target array from the stalled-active mode to the passive mode while the source array is then in the active mode.

Additionally, some embodiments are directed to a data storage array which operates as a target array during online data migration with automatic failover capabilities. Furthermore, some embodiments are directed to a data storage array which operates as a source array during online data migration with automatic failover capabilities. Also, some embodiments are directed to computer program products which enable computer logic to operate as circuitry for the target and source arrays during online data migration with automatic failover capabilities.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

An improved technique provides an automatic failover mechanism which enables a host to continue to access host data from a source array when access to a target array is lost during host data migration from the source array to the target array. Along these lines, while the host data migrates from the source array to the target array and while the target array offers copy-on-demand access to the host data, the target array provides donor updates which duplicate target array modifications to the host data on the source array. Consequently, the source array maintains a complete up-to-date copy of the host data. Furthermore, the source and target arrays exchange heartbeat signals. Accordingly, the source array is able to automatically detect when data migration has stopped. Similarly, the target array (if still operational) can automatically detect when data migration has stopped. As a result, if the source array determines that data migration has stopped (i.e., if the source array loses communication with the target array), the source array can automatically provide the host with access to the host data in a failover manner.

Figure 1:
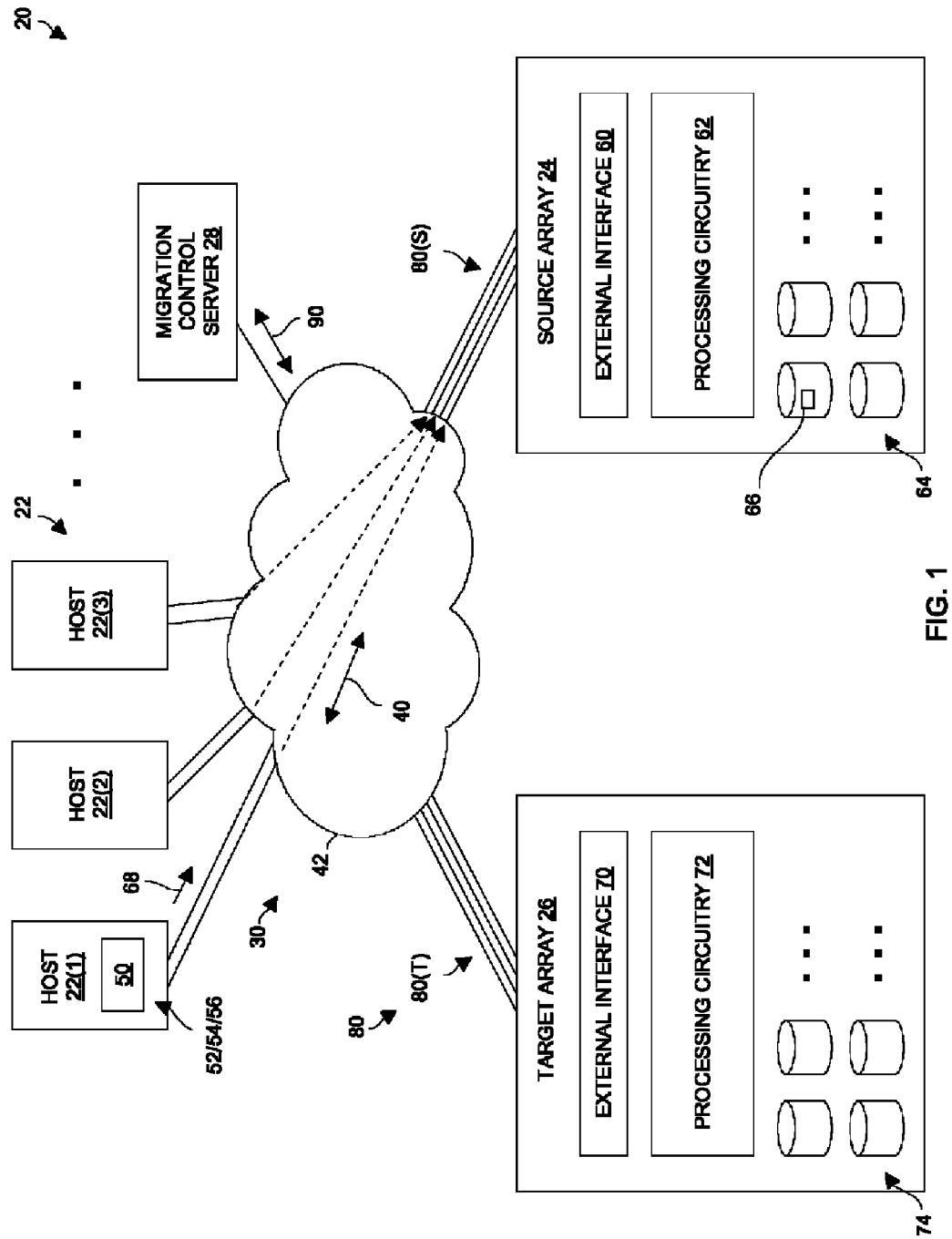
FIG. 1 is a block diagram of a computerized environment which performs automatic failover in response to a failure during online data migration.

FIG. 1 is a block diagram of a computerized environment 20 which is constructed and arranged to perform automatic failover in response to a failure during an online data migration process. The computerized environment 20 includes hosts 22(1), 22(2), 22(3), . . . (i.e., collectively, hosts 22), a source data storage array 24, a target data storage array 26, a migration control server 28, and a communications medium 30.

The communications medium 30 is constructed and arranged to convey electronic signals 40 between the various components of the computerized environment 20. Along these lines, the communications medium 30 may implement a variety of protocols such as small computer system interface (SCSI), Fibre Channel, FICON, TCP/IP, Ethernet, combinations thereof, and the like. Furthermore, at least part of the communications medium 30 is illustrated as a network cloud 42 since the communications medium 30 (i) may include various additional components (e.g., cables, switches, gateways/bridges, other SAN/NAS communications devices and interfaces, etc.) and (ii) is capable of having a variety of topologies (e.g., switched fabric, hub-and-spoke, ring, backbone, multi-drop, point-to-point, irregular, combinations thereof, etc.).

Each host 22 (e.g., see host 22(1)) includes computerized circuitry 50 (e.g., a set of processors, memory, host bus adaptors, etc.) which is constructed and arranged to perform host input/output (I/O) operations on the arrays 24, 26. To this end, each host 22 is equipped with a variety of software constructs (see host 22(1)) including an operating system 52, multipath I/O software 54, and other applications 56 (e.g., a database application).

Additionally, the source data storage array 24 (i.e., source array 24) includes an external interface 60, source array processing circuitry 62, and source storage devices 64 (i.e., source devices 64) which initially store host data 66 which is accessed by the hosts 22 via host I/O commands 68 (e.g., see host 22(1)). Similarly, the target data storage array 26 (i.e., target array 26) includes an external interface 70, source array processing circuitry 72, and target storage devices 74 (i.e., target devices 74) which are constructed and arranged to eventually receive the host data 66 and process further host I/O commands 68.

For simplicity, the host data 66 is shown in FIG. 1 as a block within one of the source devices 64. However, it should be understood that the host data 66 may initially reside in a distributed manner across multiple source devices 64.

In some arrangements, one or more of the arrays 24, 26 includes front-end adaptors (FAs), a cache (e.g., global memory), and disk adaptors (DAs). In these arrangements, the FAs (which are sometimes referred to as front-end directors or host adaptors) operate as interfaces between the hosts 22 and the cache. Similarly, the DAs (which are sometimes referred to as back-end directors or disk controllers) operate as interfaces between the cache and the storage devices 64, 74. For these arrangements, appropriately configured Symmetrix® storage systems which are provided by EMC Corporation of Hopkinton, Mass. are suitable for use as one or more of the data storage arrays 24, 26.

As shown in FIG. 1, multiple physical links 80 lead to external interfaces 60, 70 of the data storage arrays 24, 26. In particular, multiple physical links 80(S) (e.g., four physical links) lead to the external interface 60 (e.g., multiple FA ports) of the source array 24. Similarly, multiple physical links 80(T) (e.g., another four physical links) lead to the external interface 70 (e.g., multiple FA ports) of the target array 26.

The processing circuits 62, 72 of the arrays 24, 26 are constructed and arranged to present, to the hosts 22, each storage device 64, 74 as operating in either an active mode or a passive mode. A storage device 64, 74 may or may not be able to properly process certain types of host I/O commands 68 depending on which mode the storage device 64, 74 is currently in.

In particular, in active mode, a storage device 64, 74 is able to perform host read/write I/O operations (e.g., SCSI read or write operations to access host data 66) in response to host read/write I/O requests, as well as host control operations (e.g., respond to inquiry and mode sense SCSI commands from the hosts 22).

In passive mode, a storage device 64, 74 is only able to perform host control operations (e.g., inquiry, mode sense, read capacity, etc.). If a storage device 64, 74 receives a host read/write I/O request while in passive mode, that storage device 64, 74 immediately responds with an error message (e.g., responds with a check condition status code) and does not perform the requested read/write I/O operation.

Prior to migration and as shown in FIG. 1, the hosts 22 are able to perform I/O operations on the source array 24 through the communications medium 30 (e.g., see the dashed lines within the cloud 42). Here, each source storage device 64 of the source arrays 24 is initially in the active mode. Along these lines, each host 22 runs the MPIO software 54 which is appropriately configured (i.e., established switch zones, established logical pathnames, etc.) to robustly and reliably enable the host applications 56 to access the host data 66 distributed across the source devices 64.

While the hosts 22 have online access to the source array 24, the migration control server 28 is capable of communicating with various components of the computerized environment 20 through the communications medium 30, i.e., see the arrow 90 in FIG. 1. For example, the migration control server 28 can communicate directly with the target arrays 26 using system calls and/or vendor-unique commands to set up and start the migration process. Here, it is assumed that the target arrays 26 are contemporary machines which are constructed and arranged to receive and implement configuration instructions from the migration control server 28 as well as properly respond to such instructions, e.g., to provide operational status of the individual target devices 74.

Additionally, the target array 26 and the source array 24 are constructed and arranged to communicate with each other directly through the communications medium 30. Along these lines, the target array 26 is able to exchange data with the source array 24 directly, and to provide control instructions to the source array 24. For example, the target array 26 is able to provide standard SCSI commands to the source array 24, as well as receive standard SCSI responses (e.g., SCSI status codes) from the source array 24. Accordingly, it is not necessary that the migration control server 28 be able to communicate directly with the source array 24 through the communications medium 30 although such a situation may be possible.

Rather, if the source array 24 is not equipped to handle system calls from the migration control server 28 directly, the migration control server 28 is able to control the source array 24 via system calls and/or SCSI commands to the target array 26. In turn, target array 26 sends standard commands and/or vendor-unique commands to the source array 24 (i.e., command tunneling). Similarly, the migration control server 28 can receive status from the source array 24 by configuring the target array 26 to relay status that the target array 26 obtains from the source array 24 (perhaps with additional information) as the source array 24 responds to the standard commands and/or vendor-unique commands from the target array 26.

As will now be explained in further detail, the hosts 22 will have continued access to the host data 66 from the target array 26 during migration unless a failure occurs before migration is complete. For example, communication between the target array 26 and the source array 24 could be lost. As another example, the target array 26 could suffer a failure which makes it unavailable. If such a situation occurs, host access fails over to the source array 24 which had been receiving donor updates from the target array 26 thus maintained high availability of the host data 66 to the hosts 22.

Communications Between Source and Target Arrays

When the computerized environment 20 is ready to begin online data migration, each host 22 has established pathnames through the physical links 80 to each array 24, 26. In particular, the target array 26 is set up to appear as though it is simply part of the source array 24. Along these lines, the target array 26 is provisioned with the same array identifier (i.e., array ID) and storage device identifiers (i.e., device IDs) for the target devices 74 which match those of the source devices 64. Then, the MPIO software 54 running on each host 22 is presented access to the target array 26 enabling that host 22 to establish pathnames to the target devices 74 which appear to the host 22 as additional pathnames to the same source devices 64. However, the source array 24 initially presents the source devices 64 to the hosts 22 in active mode, and the target array 26 initially presents the target devices 74 to the hosts 22 in passive mode.

Additionally, the migration control server 28 is able to exchange communications 90 directly to the target array 26, and at least indirectly to the source array 24 through the target array 26 (i.e., command tunneling). In particular, the migration control server 28 is able to effectively direct progress of the arrays 24, 26 through the online migration process by providing instructions to the target array 26 and receiving back responses from the target array 26 to confirm proper progress. In some arrangements, the migration control server 28 is able to provide system calls to the target array 26 to direct target array operation, as well as order the target array 26 to send instructions (e.g., standard SCSI commands, vendor specific SCSI commands, etc.) to the source array 24 on behalf of the migration control server 28. Further details will now be provided with reference to FIG. 2.

Figure 2:
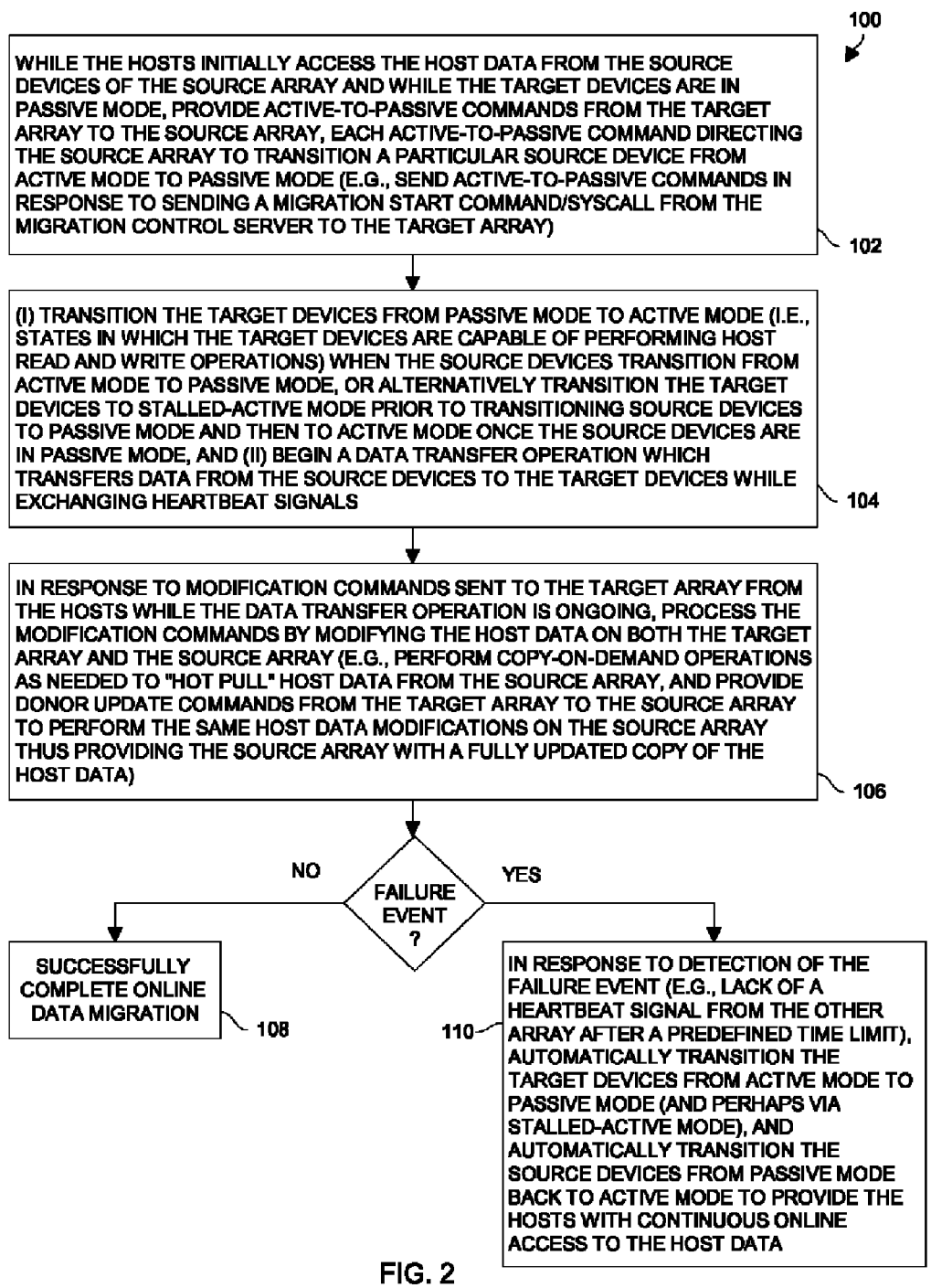
FIG. 2 is a flowchart of a procedure which is performed within the computerized environment of FIG. 1 during online data migration.

FIG. 2 is a flowchart of a procedure 100 for online data migration with automatic failover in the event of a failure during an online data migration process. In step 102, the target devices 74 begin in passive mode. Additionally, while the hosts 22 initially access the host data 66 from the source devices 64 of the source array 24 using the MPIO software 54, the target array 26 provides active-to-passive commands to the source array 24 (also see FIG. 1). Each active-to-passive command directs the source array 24 to immediately transition a particular source device 64 from active mode to passive mode.

Recall that once a source device 64 is in passive mode, the source device 64 is able to immediately perform host control commands (e.g., inquiry and mode sense commands). However, the source device 64 immediately responds to a host read/write I/O command with an error message (e.g., a check condition or not ready status code). Upon receipt of such an error message, the MPIO software 54 running on the host 22 may retry the host read/write I/O command down another path.

Step 102 may be performed in response to a start online data migration provided by the migration control server 28. In some arrangements, the migration control server 28 provides such a start command (e.g., a system call) to the target array 26 through the communications medium 30.

In step 104, the target array 26 transitions the target devices 74 from passive mode to active mode when the source devices 64 transition from active mode to passive mode. As will be explained later, some arrangements involve transitioning the target devices 74 to a stalled-active mode just prior to transitioning the source devices 64 to passive mode and then transitioning the target devices 74 from the stalled-active mode to the active mode. As a result, the target devices 74 are now able to immediately perform to host control commands (e.g., inquiry and mode sense commands) as well as host read/write I/O commands.

Additionally, in step 104, the source array 24 and the target array 26 begin a data transfer operation which transfers data from the source devices 64 to the target devices 74 (i.e., background data copying) and exchange electronic heartbeat signals (i.e., notification signals). The target array 26 is also now configured to perform copy-on-demand operations if the target array 26 receives a host read/write I/O operation relating to host data 66 that has not yet been copied from the source array 24. For such host data 66, the target array 26 is configured to "hot pull" that host data 66 out of copy order from the source array 24 in order to satisfy the host read/write I/O operation. A heartbeat signal sent from a first array 24, 26 to the second array 24, 26 indicates that the first array 24, 26 is alive and able to properly transmit to the second array 24, 26 through the communications medium 30.

In step 106, the target array 26 responds to modification commands from the hosts 22 along the lines just mentioned. That is, the target array 26 provides the hosts 22 with access to the host data 66.

Figure 3:
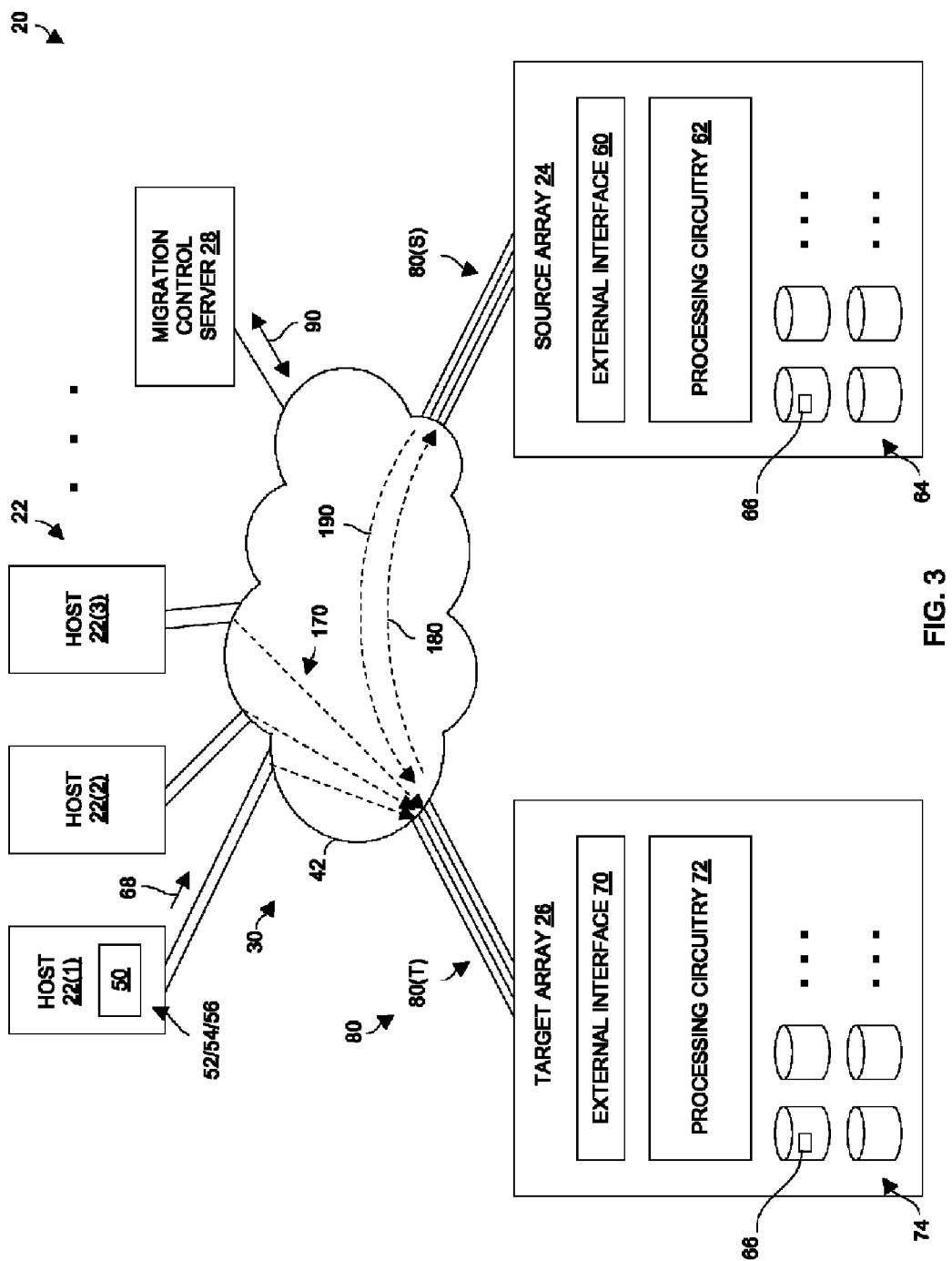
FIG. 3 is a block diagram of the computerized environment after a target array switches to providing online access to host data during online data migration.

FIG. 3 shows the hosts 22 having online access to the host data 66 from the target array 26, i.e., see the dashed lines 170 from the hosts 22 in the cloud 42. At least some of the host data 66 has been copied from the source array 24 to the target array 26.

If the requested host data 66 has not yet been copied to from the source array 24 to the target array 26, the target array 26 initiates a "hot pull" operation to obtain the host data 66 from source array 24, i.e., see dashed arrows 180, 190 which illustrate data copy communications directly between the target and source arrays 26, 24.

Additionally, in step 106 (FIG. 2), in response to all host read/write I/O commands, the target array 26 stores updated host data 66 on the target devices 74, and sends donor update commands to the source array 24. In response to the donor update commands, the source array 24 stores updated host data 66 on the source devices 64. As a result, the source array 24 continues to maintain a fully updated copy of the host data 66. It should be understood that the dashed arrows 180, 190 in FIG. 3 further illustrate these donor communications between the target and source arrays 26, 24.

It is important to note that the target array 26 does not confirm completion of a host read/write I/O command until the target array 26 confirms that the source array 24 has performed the donor update command. Such operation guarantees that the modification to the host data 66 is properly made on both arrays 24, 26.

It should be understood that the arrays 24, 26 continue to exchange heartbeat signals during the data transfer operation. As will be explained in further detail shortly, the absence of receipt of a heartbeat signal by a receiving array 24, 26 from the other array 24, 26 within a predefined amount of time informs the receiving array 24, 26 that a failure event has occurred.

In step 108, if no failure event occurs during the data transfer operation, the online migration process successfully completes. As a result, the target array 26 now has a fully updated copy of the host data 66 and can continue to provide online access to the hosts 22.

However, if a failure event does occur during the data transfer operation, the source and target arrays 24, 26 are constructed and arranged to automatically take remedial action. In particular, in step 110, due to the lack of a heartbeat signal from the target array 26 within a predefined time limit, the source array 24 automatically transitions the source devices from passive mode back to active mode. Similarly, due to the lack of a heartbeat signal from the source array 24 within another predefined time limit, the target array 26 (if possible, since the target array 26 may have crashed) automatically transitions the target devices 74 from active mode back to passive mode. As a result of this failover procedure, the source array 24 is able to continue providing online access to the host data 66 to the hosts 22.

Source Array Heartbeats

Figure 4:
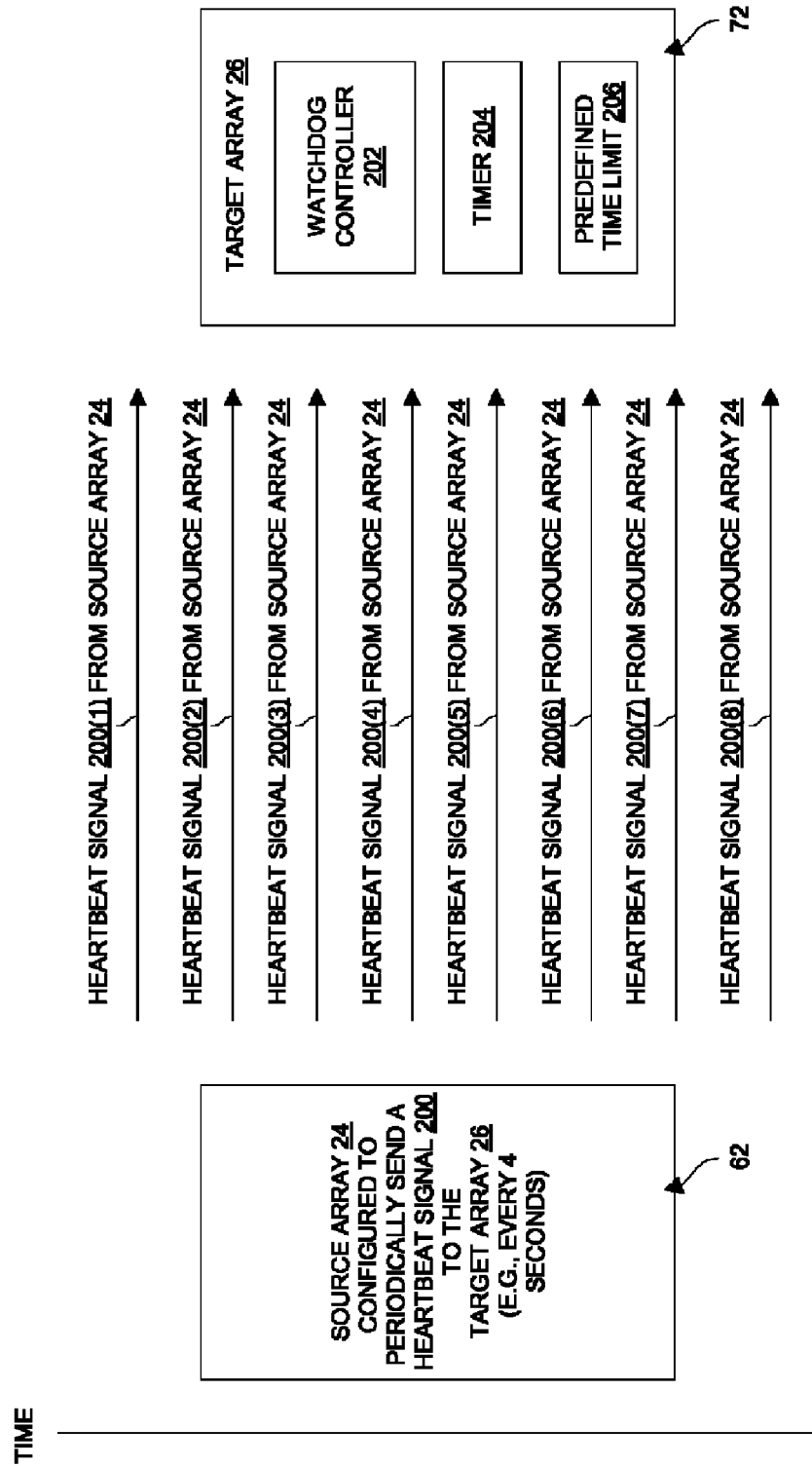
FIG. 4 is a block diagram of particular details in connection with automatic failover operation by the target array of the computerized environment.

FIG. 4 shows particular details of the source array 24 and the target array 26 with respect to heartbeat signals 200(1), 200(2), . . . (collectively, heartbeat signals 200). In particular, logic circuitry within the source array 24 is configured to periodically send a new heartbeat signal 200 to the target array 26 through the communications medium 30. As long as the source array 24 properly operates and the communications medium 30 remains intact, the target array 26 receives each heartbeat signal 200.

As further shown in FIG. 4, the processing circuitry 72 of the target array 26 (e.g., a processor and memory constructed and arranged to execute a specialized application) includes a watchdog controller 202, a timer 204 and a stored predefined time limit 206. The watchdog controller 202 resets the timer 204 when the target array 26 receives a new heartbeat signal 200 from the source array 24. Additionally, the watchdog controller 202 continuously compares the contents of the timer 204 to the stored predefined time limit 206, and detects a failure event (i.e., lost communication with the source array 24) if or when the timer 204 exceeds the stored predefined time limit 206.

In some arrangements, the source array 24 outputs a new heartbeat signal 200(1), 200(2), . . . every four (4) seconds, and the stored predefined time limit 206 is 14 seconds. In these arrangements, the target array 26 has the opportunity to miss up to three (3) heartbeat signals 200 in a row from the source array 24 before concluding that a failure event has occurred.

If the target array 26 does not receive a heartbeat signal 200 within the 14 seconds, watchdog controller 202 directs the target devices 74 to transition from active mode back to passive mode, perhaps with an intermediate transition through stalled-active mode. Additionally, the target array 26 does not perform any further host read/write I/O operations from the hosts 22 although the target array 26 may respond to host control commands (e.g., inquiry and mode sense commands).

It should be understood that such operation ensures that, if the target array 26 fails over to the source array 24, the source array 24 is able to provide online access to the host data 66. Moreover, there will be no inconsistency in the host data 66 since all updates to the host data 66 in the target array 26 have also been made to the copy of the host data 66 in the source array 24 via donor updates from the target array 26 to the source array 24.

Target Array Heartbeats

Figure 5:
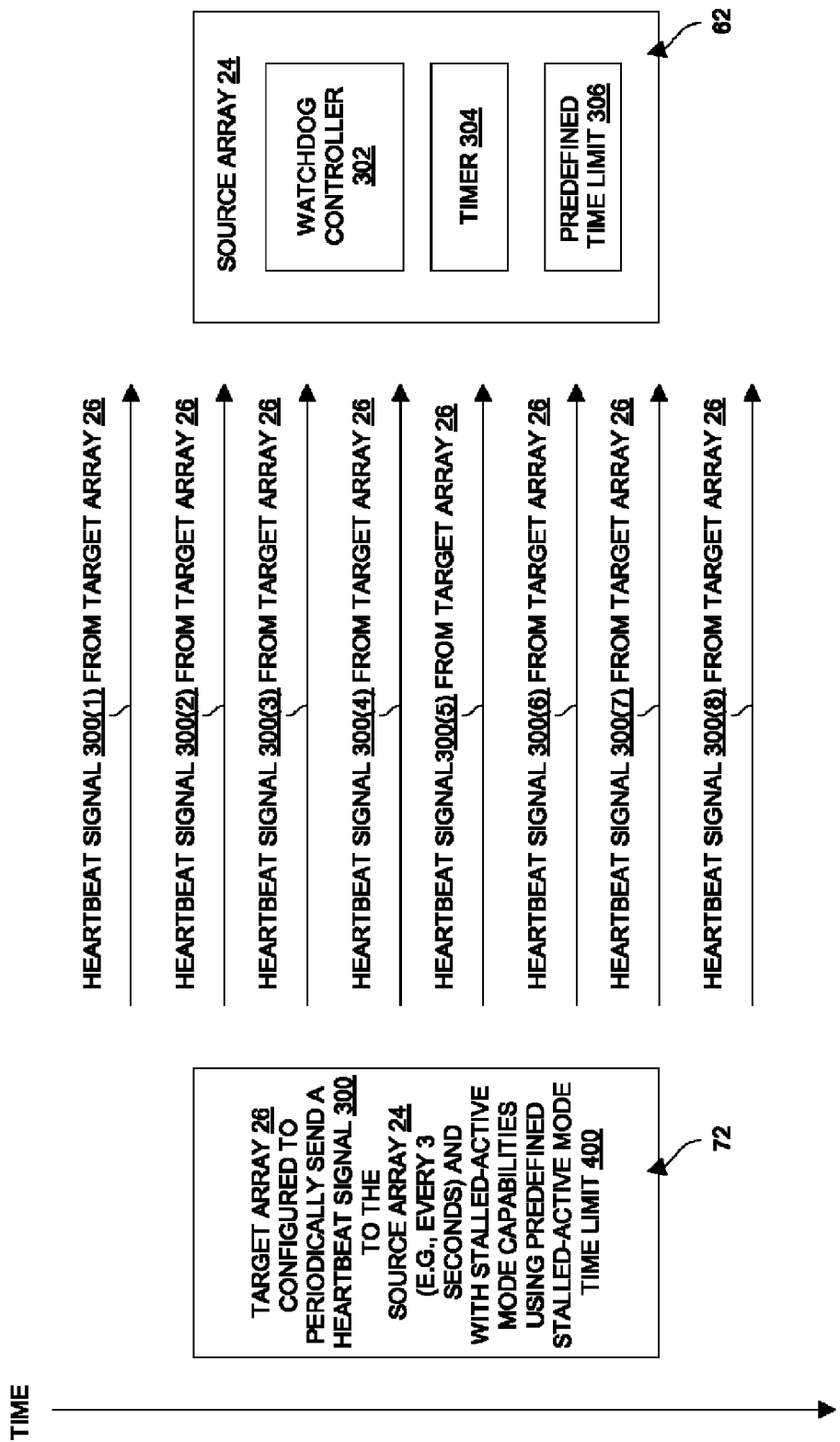
FIG. 5 is a block diagram of particular details in connection with automatic failover operation by a source array of the computerized environment.

FIG. 5 shows particular details of the source array 24 and the target array 26 with respect to heartbeat signals 300(1), 300(2), . . . (collectively, heartbeat signals 300). In particular, logic circuitry within the target array 26 is configured to periodically send a new heartbeat signal 300 to the source array 24. As long as the target array 26 properly operates and the communications medium 30 remains intact, the source array 24 receives each heartbeat signal 300.

As further shown in FIG. 5, the processing circuitry 62 of the source array 24 (e.g., a processor and memory constructed and arranged to execute a specialized application) includes a watchdog controller 302, a timer 304 and a stored predefined time limit 306. The watchdog controller 302 resets the timer 304 when the source array 24 receives a new heartbeat signal 300 from the target array 26. Furthermore, the watchdog controller 302 continuously compares the contents of the timer 304 to the stored predefined time limit 306, and identifies a failure event (i.e., lost communication with the target array 26) if/when the timer 304 surpasses the stored predefined time limit 306.

In some arrangements, the target array 26 outputs a new heartbeat signal 300(1), 300(2), . . . every three (3) seconds, and the stored predefined time limit 306 is 15 seconds. In these arrangements, the source array 24 has the opportunity to miss up to five (5) heartbeat signals 300 in a row from the target array 26 before concluding that a failure event has occurred. That is, if the source array 24 does not receive a heartbeat signal 300 within the 15 seconds, the watchdog controller 302 directs the source devices 64 to transition from passive mode back to active mode. Once the source devices 64 have returned to active mode, the source array 24 is able to perform further host read/write I/O operations from the hosts 22.

It should be understood that the source array 24 had been receiving and processing donor update commands from the target array 26 up to the point of losing communication with the target array 26. Accordingly, the source array 24 has a fully updated complete copy of the host data 66 when restoring access to the host data 66.

Additionally, it should be understood that the predefined time limit 306 of the source array 24 (e.g., 15 seconds) is preferably made slightly longer than the predefined time limit 206 used by the target array 26 (e.g., 14 seconds) to detect a failure event. Accordingly, the target devices 74 of the target array 26 are guaranteed to transition from active mode to passive mode before the source devices 64 of the source array transition from passive mode to active mode. As a result, consistency of the host data 66 is ensured.

Optionally and in some arrangements, it is presumed that the hosts 22 are able to sustain both the target devices 74 and the source devices 64 being in passive mode for approximately one (1) second. In these arrangements, the hosts 22 continue to operate normally without crashing or considering an error to have occurred.

Stalled-Active Mode Enhancement

In some arrangements, the processing circuitry 72 of the target array 26 is constructed and arranged to provide a "stalled-active" behavior for the target devices 74 immediately after detection of a failure event in which communication from the source array 24 is deemed to be lost. In stalled-active mode, the hosts 22 perceive the target devices 74 as being in active mode. Accordingly, the hosts 22 continue to operate as if the target devices 74 are able to properly perform host read/write I/O operations in response to host read/write I/O requests.

In particular, when the processing circuitry 72 of the target arrays 26 operate the target devices 74 of the target arrays 26 in stalled-active mode, the hosts 22 are able to send control requests (e.g., inquiry and mode sense SCSI commands) to the target devices 74 and immediately receive back status responses from the target devices 74 and the processing circuitry 72 (e.g., a "success" status code perhaps with additional status information). This is normal active mode (and passive mode) behavior.

However, if a host 22 sends a host read/write I/O request to a target device 74 while the target device 74 is in the stalled-active mode, the host 22 does not immediately receive back a response. Rather, the processing circuitry 72 delays (or stalls) for up to a predefined time limit 400 (e.g., more than three (3) seconds, five (5) seconds, etc.), also see FIG. 5. Such stalling provides time for certain "under the hood" operations to complete but still preserves the hosts' view of the target device 74 being in active mode, i.e., the hosts 22 do not see the target devices 74 reject read or write commands. Such under the hood operations may include waiting for the source devices 64 of the source arrays 24 to transition from the passive mode back to the active mode, and for the target devices 72 of the target arrays 26 to transition from stalled-active mode to passive mode. Although the host 22 does not receive a subsequent I/O-related message (e.g., a data frame, a transfer ready frame, etc.) from the target devices 74, the simple but delayed response from the target devices 74 in stalled-active mode is acceptable and enables the hosts 22 to maintain normal and smooth operation.

Reference is now made back to the heartbeat description provided above in connection with FIGS. 4 and 5. Suppose that the stored predefined time limit 206 for the target array 26 is 13 seconds (FIG. 4), that the stored predefined time limit 306 for the source array 24 is 15 seconds (FIG. 5), and that the source array 24 is configured to output a new heartbeat signal 200 every four (4) seconds. Further suppose that the predefined stalled-active mode time limit 400 is set to five (5) seconds (FIG. 5).

Now, suppose that the target array 26 fails to receive three (3) or more heartbeat signals 200 in a row due to a failure in the communications exchange between the target array 26 and the source array 24. After 13 seconds passes since the failure, the processing circuitry 72 of the target array 26 automatically switches the target devices 74 from active mode to stalled-active mode. At this point in time, the source devices 64 are still in passive mode. Nevertheless, the hosts 22 perceive the target devices 74 as being in active mode and thus behave normally. To this end, it should be understood that hosts 22 are typically configured to wait up to some longer amount of time before timing out due to lack of response to a host I/O command (e.g., 20 seconds, 30 seconds, etc.).

After 15 seconds passes since the failure, the source array 24 determines that the target array 26 has been lost. As a result, the source array 24 transitions the source devices 64 from passive mode back to active mode. During this time, the target devices 74 remain in stalled-active mode to accommodate the hosts 22 (i.e., the target devices 74 have been in stalled-active mode for about two (2) seconds). Accordingly, any host 22 that had issued a read or write I/O command continues to appropriately wait.

After 18 seconds passes since the failure, the target devices 74 have now remained in stalled-active mode for their prescribed time limit 400 of five (5) seconds, and are ready to transition from stalled-active mode to passive mode. However, just before the transition, the target array 26 provides acceptable active mode responses to any host read/write I/O operations that were received from the hosts 22 while in stalled-active mode (e.g., a task aborted status code which may cause the requesting host 22 to retry the host read/write I/O operation). Since the source devices 64 have transitioned back to the active mode, the hosts 22 have immediate access to the host data 66 from the source array 24.

It should be understood that the responses from the target array 26 back to the hosts 22 are provided within an acceptable time limit (e.g., within 20 seconds of the hosts 22 sending the read or write I/O commands) thus preventing the hosts 22 from timing out. More importantly, such operation is helpful since it enables the hosts 22 to view at least one array 24, 26 as having storage devices 64, 74 in active mode at all times.

CONCLUSION

As mentioned above, improved techniques provide an automatic failover mechanism which enables hosts 22 to continue to access host data 66 from a source array 24 when access to a target array 26 is lost during host data migration from the source array 24 to the target array 26. In particular, while the host data 66 migrates from the source array 24 to the target array 26 and while the target array 26 offers copy-on-demand access to the host data 66, the target array 26 provides donor updates which duplicate target array modifications to the host data 66 on the source array 24. Consequently, the source array 24 maintains a complete up-to-date copy of the host data 66. Additionally, the source and target arrays 24, 26 exchange heartbeat signals 200, 300. Accordingly, the source array 24 is able to automatically detect when data migration has stopped (i.e., no receipt of heartbeat signals 300 within a predefined time limit 306). Similarly, the target array 26 (if still operational) can automatically detect when data migration has stopped (i.e., no receipt of heartbeat signals 200 within another predefined time limit 206). As a result, if the source array 24 determines that data migration has stopped (i.e., if the source array 24 loses communication with the target array 26), the source array 24 can provide the hosts 22 with access to the host data 66 in an automatic failover manner.

It should be understood that the above-described failover techniques are performed automatically via coordination between the target array 26 and the source array 24. Accordingly, such operation alleviates burdening a host 22 to control failover. Rather, the source devices 64 of the source array 24 are capable of returning to active mode without being told.

While various embodiments of the invention have been particularly shown and described, it will be understood by those skilled in the art that various changes in form and details may be made therein without departing from the spirit and scope of the invention as defined by the appended claims.

For example, failover operation was explained above as occurring at the array level. Nevertheless, it should be understood that failover operation can be implemented at the storage device level as well. Along these lines, if there is failure event involving the inability to read or write to a particular storage device during online data migration, failover can take place on a device-by-device basis. Alternatively, it may be prudent for failover to occur so that the hosts 22 obtain the host data 66 from the source array 24 rather continue the online data migration process. However, in such arrangements, these device-level failover features may be disabled if it is preferred that one failed storage device does not completely stop the data migration process.

Additionally, it should be understood that the failover operation can be purposefully triggered under certain situations. For example, a parameter can be set so that data migration automatically stops and failback automatically occurs if data migration does not complete within a predetermined amount of time. Here, failing back and regaining system performance may be preferred over completing the migration process. Such modifications and enhancements are intended to belong to various embodiments of the invention.

What is claimed is:

1. A method of handling a failure during a data migration process which is constructed and arranged to migrate data from a storage device of a source array to a storage device of a target array, each storage device being capable of operating in (i) an active mode in which that storage device is permitted to perform read and write operations and (ii) a passive mode in which that storage device is not permitted to perform read and write operations, the method comprising:
   while a host initially accesses host data from the storage device of the source array using multipath I/O software, providing an active-to-passive command to the source array, the active-to-passive command directing the source array to transition the storage device of the source array from the active mode to the passive mode;
   when the storage device of the source array transitions from the active mode to the passive mode, transitioning the storage device of the target array from the passive mode to the active mode and beginning a data transfer operation which transfers data from the storage device of the source array to the storage device of the target array;
   in response to modification commands sent to the target array from the host while the data transfer operation is ongoing, processing the modification commands by modifying host data on the target array and on the source array; and
   in response to detection of a failure event in which the target array loses communication with the source array for a predefined amount of time, transitioning the storage device of the target array from the active mode back to the passive mode.

2. A method as in claim 1 wherein transitioning the storage device of the target array from the active mode back to the passive mode includes:
   upon detection of the failure event, preventing processing of further modification commands sent to the target array from the host to enable the host to send the further modification commands to the source array for completion.

3. A method as in claim 1 wherein providing the active-to-passive command from the target array to the source array includes:
   receiving a start command from a migration control server, and
   sending the active-to-passive command from the target array to the source array in response to the start command from the migration control server.

4. A method as in claim 3 wherein receiving the start command from the migration control server includes acquiring a system call from the migration control server; and
   wherein sending the active-to-passive command from the target array to the source array includes outputting, as the active-to-passive command, a vendor-unique small computer system interface (SCSI) command from the target array to the source array to transition the storage device of the source array from the active mode to the passive mode.

5. A method as in claim 1 wherein processing the modification commands by modifying host data on the target array and on the source array includes:
   receiving, at the target array, a particular modification command from the host, and
   in response to the particular modification command, updating host data on the target array, and sending a donor update command from the target array to the source array to update the host data on the source array.

6. A method as in claim 5 wherein the donor update command is a standard small computer system interface (SCSI) command; and
   wherein processing the modification commands by modifying host data on the target array and on the source array further includes:
   waiting for a SCSI response indicating that the host data on the source array has been updated in response to the vendor-unique SCSI command, and
   after receiving the SCSI response, sending a reply to the host indicating completion of the particular modification command.

7. A method as in claim 5 wherein updating host data on the target array includes:
   sending a small computer system interface (SCSI) command to the source array to retrieve the host data from the source array in a copy-on-demand manner, and
   modifying the host data retrieved from the source array and storing the modified host data in the target array.

8. A method as in claim 1, further comprising:
   detecting, as the failure event, failure to receive multiple source array heartbeat signals from the source array by the target array during a predefined source array time limit.

9. A method as in claim 8 wherein the source array is constructed and arranged to output a new heartbeat signal to the target array every X seconds; and wherein the predefined heartbeat time limit is substantially Y seconds, Y being longer than X.

10. A method as in claim 9 wherein Y is at least three times as long as X.

11. A method as in claim 9 wherein the target array is constructed and arranged to output a new heartbeat signal to the source array every Z seconds; and wherein Y is at least three times as large as Z.

12. A method as in claim 8 wherein transitioning the storage device of the target array from the active mode back to the passive mode includes:
moving the storage device of the target array from the active mode to a stalled-active mode immediately after detection of the failure event and while the source device is in the passive mode,
waiting a predefined amount of time and moving the storage device of the target array from the stalled-active mode to the passive mode while the source device is in the active mode.

13. A method as in claim 12 wherein waiting the predefined amount of time and moving the storage device of the target array from the stalled-active mode to the passive mode includes:
holding the target device in stalled-active mode for at least three seconds.

14. A method as in claim 13 wherein holding the target device in stalled-active mode for at least three seconds includes:
maintaining the target device in stalled-active mode for substantially five seconds.

15. A data storage array to operate as a target array involved in a migration process in which data is migrated from a storage device of a source array to a storage device of the target array, each storage device being capable of operating in (i) an active mode in which that storage device is permitted to perform host read and write operations and (ii) a passive mode in which that storage device is not permitted to perform host read and write operations, the data storage array comprising:
an external interface;
a group of storage devices; and
processing circuitry coupled to the external interface and the group of storage devices, the processing circuitry being constructed and arranged to:
while a host initially accesses host data from the storage device of the source array using multipath I/O software, providing an active-to-passive command to the source array through the external interface, the active-to-passive command directing the source array to transition the storage device of the source array from the active mode to the passive mode,
when the storage device of the source array transitions from the active mode to the passive mode, transitioning a storage device of the target array from the passive mode to the active mode and beginning a data transfer operation which transfers data from the storage device of the source array to the storage device of the target array through the external interface,
in response to modification commands sent to the target array from the host while the data transfer operation is ongoing, processing the modification commands by modifying host data on the target array and on the source array, and
in response to detection of a failure event in which the target array loses communication with the source array for a predefined amount of time, transitioning the storage device of the target array from the active mode back to the passive mode.

16. A data storage array as in claim 15 wherein the processing circuitry, when transitioning the storage device of the target array from the active mode back to the passive mode, is constructed and arranged to:
upon detection of the failure event, prevent processing of further modification commands sent to the target array from the host to enable the host to send the further modification commands to the source array for completion.

17. A data storage array as in claim 15 wherein the processing circuitry, when processing the modification commands by modifying host data on the target array and on the source array, is constructed and arranged to:
receive a particular modification command from the host, in response to the particular modification command, update host data on the target array, and sending a donor update command through the external interface to the source array to update the host data on the source array.

18. A data storage array as in claim 15 wherein the processing circuitry is further constructed and arranged to:
detect, as the failure event, failure to receive multiple source array heartbeat signals from the source array during a predefined source array time limit.

19. A computer program product which includes a non-transitory computer readable storage medium storing instructions to perform, when executed on a computerized processor of a target array, a method of handling a failure during a data migration process which is constructed and arranged to migrate data from a storage device of a source array to a storage device of the target array, each storage device being capable of operating in (i) an active mode in which that storage device is permitted to perform read and write operations and (ii) a passive mode in which that storage device is not permitted to perform read and write operations, the method comprising:
while a host initially accesses host data from the storage device of the source array using multipath I/O software, providing an active-to-passive command to the source array, the active-to-passive command directing the source array to transition the storage device of the source array from the active mode to the passive mode;
when the storage device of the source array transitions from the active mode to the passive mode, transitioning the storage device of the target array from the passive mode to the active mode and beginning a data transfer operation which transfers data from the storage device of the source array to the storage device of the target array;
in response to modification commands sent to the target array from the host while the data transfer operation is ongoing, processing the modification commands by modifying host data on the target array and on the source array; and
in response to detection of a failure event in which the target array loses communication with the source array for a predefined amount of time, transitioning the storage device of the target array from the active mode back to the passive mode.

20. A method of handling a failure during a data migration process which is constructed and arranged to migrate data from a storage device of a source array to a storage device of a target array, each storage device being capable of operating in (i) an active mode in which that storage device is permitted to perform read and write operations and (ii) a passive mode in which that storage device is not permitted to perform read and write operations, the method comprising:
while a host initially accesses host data from the storage device of the source array using multipath I/O software, receiving an active-to-passive command sent to the source array, the active-to-passive command directing the source array to transition the storage device of the source array from the active mode to the passive mode;
transitioning the storage device of the source array from the active mode to the passive mode in response to the active-to-passive command;
after the storage device of the source array transitions from the active mode to the passive mode, beginning a data transfer operation which transfers data from the storage device of the source array to the storage device of the target array;

in response to modification commands sent to the target array from the host while the data transfer operation is ongoing, processing the modification commands by modifying host data on the source array to match host data modifications made on the target array; and in response to detection of a failure event in which the source array loses communication with the target array for a predefined amount of time, transitioning the storage device of the source array from the passive mode back to the active mode.

21. A method as in claim 20, further comprising:
after the storage device of the source array transitions from the passive mode back to the active mode, processing further modification commands sent to the source array from the host to provide the host with continued access to the host data.

22. A method as in claim 20 wherein processing the modification commands by modifying the host data on the source array to match host data modifications made on the target array includes:
receiving a donor update command sent from the target array to the source array to update the host data on the source array in response to a particular modification command from the host.

23. A method as in claim 20, further comprising:
detecting, as the failure event, failure to receive multiple target array heartbeat signals from the target array during a predefined target array time limit.

24. A data storage array to operate as a source array involved in a migration process in which data is migrated from a storage device of the source array to a storage device of a target array, each storage device being capable of operating in (i) an active mode in which that storage device is permitted to perform host read and write operations and (ii) a passive mode in which that storage device is not permitted to perform host read and write operations, the data storage array comprising:
an external interface;
a group of storage devices; and
processing circuitry coupled to the external interface and the group of storage devices, the processing circuitry being constructed and arranged to:
while a host initially accesses host data from a storage device of the source array using multipath I/O software, receiving an active-to-passive command sent from the target array through the external interface, the active-to-passive command directing the source array to transition the storage device of the source array from the active mode to the passive mode,
transitioning the storage device of the source array from the active mode to the passive mode in response to the active-to-passive command,
after the storage device of the source array transitions from the active mode to the passive mode, beginning a data transfer operation which transfers data from the storage device of the source array to the storage device of the target array through the external interface,
in response to modification commands sent to the target array from the host while the data transfer operation is ongoing, processing the modification commands by modifying host data on the source array to match host data modifications made on the target array, and
in response to detection of a failure event in which the source array loses communication with the target array for a predefined amount of time, transitioning the storage device of the source array from the passive mode back to the active mode.

25. A data storage array as in claim 24 wherein the processing circuitry is further constructed and arranged to:
after the storage device of the source array transitions from the passive mode back to the active mode, process further modification commands sent to the source array from the host to provide the host with continued access to the host data.

26. A data storage array as in claim 24 wherein the processing circuitry, when processing the modification commands by modifying the host data on the source array to match host data modifications made on the target array, is constructed and arranged to:
receive a donor update command sent from the target array to the source array to update the host data on the source array in response to a particular modification command from the host.

27. A data storage array as in claim 24 wherein the processing circuitry is further constructed and arranged to:
detect, as the failure event, failure to receive multiple target array heartbeat signals from the target array during a predefined target array time limit.

28. A computer program product which includes a non-transitory computer readable storage medium storing instructions to perform, when executed on a computerized processor of a source array, a method of handling a failure during a data migration process which is constructed and arranged to migrate data from a storage device of the source array to a storage device of a target array, each storage device being capable of operating in (i) an active mode in which that storage device is permitted to perform read and write operations and (ii) a passive mode in which that storage device is not permitted to perform read and write operations, the method comprising:
while a host initially accesses host data from the storage device of the source array using multipath I/O software, receiving an active-to-passive command sent to the source array, the active-to-passive command directing the source array to transition the storage device of the source array from the active mode to the passive mode;
transitioning the storage device of the source array from the active mode to the passive mode in response to the active-to-passive command;
after the storage device of the source array transitions from the active mode to the passive mode, beginning a data transfer operation which transfers data from the storage device of the source array to the storage device of the target array;
in response to modification commands sent to the target array from the host while the data transfer operation is ongoing, processing the modification commands by modifying host data on the source array to match host data modifications made on the target array; and
in response to detection of a failure event in which the source array loses communication with the target array for a predefined amount of time, transitioning the storage device of the source array from the passive mode back to the active mode.

* * * * *